United States Patent
Hannon et al.

(12)

(10) Patent No.: US 6,753,374 B1
(45) Date of Patent: Jun. 22, 2004

(54) RUBBER COMPOSITIONS AND METHOD FOR INCREASING THE MOONEY SCORCH VALUE

(75) Inventors: Martin J. Hannon, Bethany, CT (US); Robert J. Cornell, Prospect, CT (US); Sung W. Hong, Chesire, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 257 days.

(21) Appl. No.: 09/590,320

(22) Filed: Jun. 8, 2000

(51) Int. Cl.[7] .................................................. C08K 3/34
(52) U.S. Cl. ..................... 524/492; 524/392; 524/201; 523/152; 152/209.1
(58) Field of Search .............................. 524/492, 392, 524/201; 523/152; 152/209.1

(56) References Cited

U.S. PATENT DOCUMENTS

| | | | |
|---|---|---|---|
| 3,852,354 A | * 12/1974 | Usamoto et al. ............... 564/76 |
| 4,397,987 A | * 8/1983 | Cornell ......................... 525/75 |
| 4,687,756 A | 8/1987 | Okamoto et al. |
| 6,025,428 A | 2/2000 | Day |
| 6,242,523 B1 | * 6/2001 | Blok et al. ................... 524/495 |
| 6,273,163 B1 | * 8/2001 | Materne et al. ............. 152/548 |
| 6,620,875 B2 | * 9/2003 | Hong et al. .................. 524/492 |

FOREIGN PATENT DOCUMENTS

EP 479526 * 4/1992

* cited by examiner

*Primary Examiner*—Cephia D. Toomer
(74) *Attorney, Agent, or Firm*—Daniel Reitenbach

(57) ABSTRACT

A rubber composition is disclosed wherein the rubber composition contains at least (a) a rubber component; (b) a silica filler; and, (c) at least one thiuram disulfide accelerator, it being provided that diphenyl guanidine is substantially absent in the rubber composition. The compositions may also include suitable amounts of other ingredients such as carbon black, coupling agents, antiozonants, antioxidants, etc.

20 Claims, No Drawings

RUBBER COMPOSITIONS AND METHOD FOR INCREASING THE MOONEY SCORCH VALUE

BACKGROUND OF THE INVENTION

This invention relates generally to rubber compositions and a method for increasing the Mooney Scorch value of a rubber composition. More particularly, the rubber composition described herein contains at least (a) a rubber component; (b) a silica filler, and, (c) at least one thiuram disulfide accelerator which increases the silica associated properties. The rubber compositions are particularly useful for tire tread applications in vehicles, e.g., passenger automobiles and trucks.

The tire treads of modern tires must meet performance standards which require a broad range of desirable properties. Thus, rubber compositions suitable for, e.g., tire treads, should exhibit not only desirable strength and elongation, particularly at high temperatures, but also good cracking resistance, good abrasion resistance, desirable skid resistance and low tan delta values at low frequencies for desirable rolling resistance. Additionally, a high complex dynamic modulus is necessary for maneuverability and steering control.

Major tire manufacturers have developed tire tread compounds which provide lower rolling resistance for improved fuel economy and better skid/traction for a safer ride. Three types of performance are important in tread compounds. They include good wear resistance, good traction and low rolling resistance.

Presently, silica has been added to rubber compositions as a filler to replace some or substantially all of the carbon black filler to improve these properties, e.g., lower rolling resistance. Although more costly than carbon black, the advantages of silica include, for example, improved wet traction, low rolling resistance, etc., with reduced fuel consumption. Problems associated with the use of silica include processing difficulties and reduced wear. The wear reduction is believed to be associated with the less uniform silica dispersion properties and decreased reinforcement characteristics of silica as compared with carbon black.

The difficulties in dispersing silica are believed to be associated with the polar nature of silica and non-polar nature of rubber. Regardless, the silica has been found to form localized clumps or aggregations in the rubber which detract from both tire wear and fuel consumption. As compared with carbon black, silica does not react as strongly with the rubber and thereby tends to give less strength to the rubber.

It is known to use coupling agents to enhance the rubber reinforcement characteristics of silica A coupling agent is a bi-functional molecule that will react with the silica at one end thereof and cross-link with the rubber at the other end thereof. In this manner, the reinforcement and strength of the rubber are improved, e.g. the toughness, strength, modulus, tensile and abrasion resistance are particularly improved. The coupling agent is believed to cover the surface of the silica particle which then hinders the silica from agglomerating with other silica particles. By interfering with the agglomeration process, the dispersion is improved and therefore the wear and fuel consumption are improved.

The use of silica in relatively large proportions for improving various tire properties has been found to undesirably slow the cure rate of the rubber. This has led to the use of secondary accelerators such as diphenyl guanidine (DPG) in amounts which increase the cure rate. These accelerators are typically used in combination with other accelerators such as sulfenamides.

However, the use of these secondary accelerators, and particularly DPG, typically result in the rubber composition possessing a lower Mooney scorch value during its manufacture thereby resulting in decreased processing time. Problems associated with a decreased processing time include, for example, precured compounds and rough surfaces on extruded parts. Additionally, diphenyl guanidine is typically employed in high amounts which result in the rubber compositions being more expensive to manufacture since more material must be used.

SUMMARY OF THE INVENTION

In accordance with the present invention a rubber composition is provided which comprises (a) a rubber component; (b) a silica filler; and, (c) at least one thiuram disulfide accelerator, it being provided that diphenyl guanidine is substantially absent in the rubber composition.

By employing a thiuram disulfide in place of diphenyl guanidine in a rubber composition, the rubber compositions disclosed herein advantageously possess a higher Mooney Scorch value relative to a rubber composition containing diphenyl guanidine. This allows for a longer processing time of the rubber which, in turn, provides for further manufacturing of the rubber. Additionally, significantly lower amounts of the thiuram disulfides can be employed in the rubber compositions described herein relative to the amounts of which diphenyl guanidine has been used in rubber compositions thereby providing an economical advantage by using less materials.

DESCRIPTION OF THE PREFERRED EMBODIMENTS

The rubber compositions of this invention contains at least (a) a rubber component; (b) a silica filler, and, (c) at least one thiuram disulfide accelerator, it being provided that diphenyl guanidine is substantially absent in the rubber composition.

The rubber components for use herein are based on highly unsaturated rubbers such as, for example, natural or synthetic rubbers. Representative of the highly unsaturated polymers that can be employed in the practice of this invention are diene rubbers. Such rubbers will ordinarily possess an iodine number of between about 100 to about 250, although highly unsaturated rubbers having a higher or a lower (e.g., of 50–100) iodine number can also be employed. Illustrative of the diene rubbers that can be utilized are polymers based on conjugated dienes such as, for example, 1,3-butadiene; 2-methyl-1,3-butadiene; 1,3-pentadiene; 2,3-dimethyl-1,3-butadiene; and the like, as well as copolymers of such conjugated dienes with monomers such as, for example, styrene, alpha-methylstyrene, acetylene, e.g., vinyl acetylene, acrylonitrile, methacrylonitrile, methyl acrylate, ethyl acrylate, methyl methacrylate, ethyl methacrylate, vinyl acetate, and the like. Preferred highly unsaturated rubbers include natural rubber, cis-polyisoprene, polybutadiene, poly(styrene-butadiene), styrene-isoprene copolymers, isoprene-butadiene copolymers, styrene-isoprene-butadiene tripolymers, polychloroprene, chloro-isobutene-isoprene, nitrile-chloroprene, styrene-chloroprene, and poly (acrylonitrile-butadiene). Moreover, mixtures of two or more highly unsaturated rubbers with elastomers having lesser unsaturation such as EPDM, EPR, butyl or halogenated butyl rubbers are also within the contemplation of the invention.

Suitable silica fillers include silica, precipitated silica, amorphous silica, vitreous silica, fumed silica, fused silica, synthetic silicates such as aluminum silicates, alkaline earth metal silicates such as magnesium silicate, calcium silicate and the like with BET surfaces of 20 to 400 m²/g and primary particle diameters of 10 to 400 nm, natural silicates such as kaolin and other naturally occurring silicas and the like. Also useful are highly dispersed silicas prepared, for example, by precipitation of solutions of silicates or by flame hydrolysis of silicon halides with specific surfaces of 5 to 1000 m²/g and preferably 20 to 400 m²/g (BET surface) with primary particle sizes of 100 to 400 nm. The silicas can also be present in the form of mixed oxides with other metal oxides such as Al, Mg, Ca, Ba, Zn, Zr, Ti oxides and the like. Silicas are commercially available from such sources as Cabot Corporation under the Cab-O-Sil® tradename; PPG Industries under the Hi-Sil and Ceptane tradenames; Rhodia under the Zeosil tradename and Degussa AG under the Ultrasil and Coupsil tradenames. Mixtures of two or more silica fillers can be used in preparing the rubber composition of this invention. A preferred silica for use herein is Zeosil 1165MP manufactured by Rhodia.

Generally, the silica filler is incorporated into the rubber composition in an amount ranging from about 10 to about 100 parts per hundred parts of rubber (phr), preferably from about 15 to about 85 parts per hundred parts of rubber and more preferably from about 40 to about 80 parts per hundred parts of rubber.

It is advantageous to employ carbon black fillers with the silica filler in forming the rubber compositions of this invention. Suitable carbon black fillers include any of the commonly available, commercially-produced carbon blacks known to one skilled in the art. Those having a surface area (EMSA) of at least 20 m²/g and more preferably at least 35 m²/g. up to 200 m²/g or higher are preferred. Surface area values used in this application are those determined by ASTM test D-3765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the rubber compositions of the invention. Typical values for surface areas of usable carbon blacks are summarized in the following Table I.

TABLE I

Carbon Blacks

| ASTM Designation (D-1765-82a) | Surface Area (m²/g) (D-3765) |
|---|---|
| N-110 | 126 |
| N-220 | 111 |
| N-339 | 95 |
| N-330 | 83 |
| N-550 | 42 |
| N-660 | 35 |

The carbon blacks utilized in the invention may be in pelletized form or an unpelletized flocculant mass. Preferably, for ease of handling, pelletized carbon black is preferred. The carbon blacks are ordinarily incorporated into the rubber composition in amounts ranging from about 20 to about 200 parts per hundred parts of rubber and preferably from about 40 to about 80 parts per hundred parts of rubber.

The thiuram disulfides for use in the rubber composition of this invention as an accelerator advantageously provide a rubber composition possessing a greater Mooney Scorch value than that of a similar rubber composition in which a significant amount up to the entire amount of the thiuram disulfide has been replaced with diphenyl guanidine as an accelerator. Suitable thiuram disulfides can be any available thiuram disulfide known to one skilled in the art. Representative of the thiuram disulfides are those of the general formula

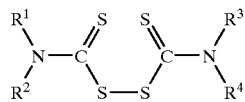

wherein $R^1$, $R^2$, $R^3$ and $R^4$ each are the same or different and are hydrogen or hydrocarbon of up to about 30 carbon atoms, optionally containing one or more heterocyclic groups, or $R^1$ and $R^2$ and/or $R^3$ and $R^4$ together with the nitrogen atom to which they are bonded are joined together to form a heterocyclic group, optionally containing one or more additional heterocyclic atoms. Specific thiuram disulfides include those in which $R^1$, $R^2$, $R^3$ and $R^4$ are independently selected to be methyl, ethyl, propyl, isopropyl, butyl, isobutyl, pentyl, hexyl, cyclohexyl, heptyl, octyl, 2-ethylhexyl, nonyl, decyl, undecyl, dodecyl, stearyl, oleyl, phenyl, benzyl, tridecyl, tetradecyl, pentadecyl, hexadecyl, heptadecyl, octadecyl, nonadecyl, eicosanyl, and the like, containing, e.g., up to about 30 carbon atoms, preferably no more than about 24 carbon atoms and more preferably no more than about 18 carbon atoms. It is particularly advantageous to employ a thiuram disulfide wherein $R^1$, $R^2$, $R^3$ and $R^4$ each possess between 8 to 18 carbon atoms. A particularly preferred thiuram disulfide for use herein is wherein $R^1$, $R^2$, $R^3$ and $R^4$ each possess between 12 and 14 carbon atoms.

Generally, the thiuram disulfide is present in the rubber composition of this invention in an amount ranging from about 0.05 to about 20 parts per hundred parts of rubber, preferably from about 0.1 to about 5 parts per hundred parts of rubber and more preferably from about 0.15 to about 2 parts per hundred parts of rubber.

A coupling agent can be incorporated into the rubber composition of the present invention. Suitable coupling agents include any coupling agent which has conventionally been compounded together with a silica filler in a rubber composition. Examples of such a coupling agent are vinyltrichlorosilane, vinyltrimethoxysilane, vinyltriethoxysilane, vinyltris(β-methoxyethoxy) silane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldimethoxysilane, γ-methacryloxypropyltriethoxysilane, N-β(aminoethyl)-γ-aminopropylmethyldimethoxysilane, N-β-aminoethyl)γ-aminopropyltrimethoxysilane, N-β(aminoethyl)γ-aminopropyltrimethoxysilane, γ-aminopropyltrimethoxysilane, γ-aminopropyltrimethoxysilane, N-phenyl-γ-aminopropyltrimethoxysilane, γ-chloropropyltrimethoxysilane, γ-mercaptopropyltrimethoxysilane, bis-(3-[triethoxysilyl]propyl)tetrasulfane and the like; bis-[3-(triethoxysilyl)propyl]tetrasulfide; 3-trimethoxysilylpropyl-N,N-dimethylthiocarbamoyltetrasulfide; trimethoxysilylpropyl-mercaptobenz-thiazoltetrasulfide; triethoxysilylpropyl-methacrylate monosulfide; dimethoxymethylsilylpropyl-N,N-dimethyl-thiocarbamoyltetrasulfide; dithiodipropionic acid and the like and mixtures. The coupling agent is ordinarily employed in amounts ranging from about 0.5 to about 20 parts per hundred parts of rubber and preferably from about 3 to about 15 parts per hundred parts of rubber.

The rubber compositions of this invention are particularly useful when manufactured into articles such as, for example, tires, motor mounts, rubber bushings, power belts, printing rolls, rubber shoe heels and soles, rubber floor tiles, caster wheels, elastomer seals and gaskets, conveyor belt covers, hard rubber battery cases, automobile floor mats, mud flap for trucks, ball mill liners, windshield wiper blades and the like. Preferably, the rubber compositions of this invention are advantageously used in a tire as a component of any or all of the thermosetting rubber-containing portions of the tire. These include the tread, sidewall, and carcass portions of, for example, a truck tire, passenger tire, off-road vehicle tire, high speed tire, motorcycle tire and the like that also contain many different reinforcing layers therein.

The rubber composition of this invention can be formulated in any conventional manner. In addition to the rubber component, silica filler, thiuram disulfide accelerator, and coupling agent, at least one other common additive can be added to the rubber compositions of this invention, if desired or necessary, in a suitable amount. Suitable common additives for use herein include vulcanizing agents, activators, retarders, antioxidants, plasticizing oils and softeners, fillers other than silica and carbon black, reinforcing pigments, antiozonants, waxes, tackifier resins, and the like and combinations thereof.

EXAMPLES

The following Examples are intended to further illustrate the present invention and are not intended to limit the scope of the invention in any manner.

Examples 1–4 and Comparative Example A

Employing the ingredients indicated in Tables II and III (which are listed in parts per hundred of rubber by weight), several rubber compositions were compounded in the following manner: the ingredients indicated in Table II were added to an internal mixer and mixed until the materials are incorporated and thoroughly dispersed and discharged from the mixer. Discharge temperatures of about 160° C. are typical. The batch is cooled, and is reintroduced into the mixer along with the ingredients indicated in Table III. The second pass is shorter and discharge temperatures generally run between 93–105° C.

TABLE II

PHASE I

| Example or Comparative Example | 1 | 2 | 3 | 4 | A |
|---|---|---|---|---|---|
| Solflex 1216[1] | 75.00 | 75.00 | 75.00 | 75.00 | 75.00 |
| Budene 1207[2] | 25.00 | 25.00 | 25.00 | 25.00 | 25.00 |
| N234[3] | 32.00 | 32.00 | 32.00 | 32.00 | 32.00 |
| Zeosil 1165[4] | 44.00 | 44.00 | 44.00 | 44.00 | 44.00 |
| Si69[5] | 3.52 | 3.52 | 3.52 | 3.52 | 3.52 |
| Sundex 8125[6] | 32.50 | 32.50 | 32.50 | 32.50 | 32.50 |
| Stearic Acid | 1.00 | 1.00 | 1.00 | 1.00 | 1.00 |
| Flexzone 7P[7] | 2.00 | 2.00 | 2.00 | 2.00 | 2.00 |
| Sunproof IMP Improved[8] | 1.50 | 1.50 | 1.50 | 1.50 | 1.50 |
| MB-1:Total | 216.52 | 216.52 | 216.52 | 216.52 | 216.52 |

[1]Solution styrene-butadiene rubber low bound styrene and medium vinyl content available from Goodyear.
[2]Polybutadiene rubber available from Goodyear.
[3]High surface area carbon black available from Cabot Corp.
[4]Highly dispersable silica available from Rhodia.
[5]Silane coupling agent bis-(3-[triethoxysilyl]propyl)tetrasulfane available from Degussa.
[6]Aromatic oil available from Sun Oil.
[7]Paraphenylene diamine available from Uniroyal Chemical Company.
[8]Blend of hydrocarbon waxes available from Uniroyal Chemical Company.

TABLE III

PHASE II

| Example or Comparative Example | 1 | 2 | 3 | 4 | A |
|---|---|---|---|---|---|
| MB-1[9] | 216.52 | 216.52 | 216.52 | 216.52 | 216.52 |
| Zinc Oxide | 2.50 | 2.50 | 2.50 | 2.50 | 2.50 |
| Delac NS[10] | 1.50 | 1.50 | 1.50 | 1.50 | 1.50 |
| Sulfur 21-10[11] | 2.00 | 2.00 | 2.00 | 2.00 | 2.00 |
| Diphenyl guanidine | 0.00 | 0.00 | 0.00 | 0.00 | 1.00 |
| Benzyl Tuex[12] | 0.00 | 0.00 | 0.15 | 0.25 | 0.00 |
| Royalac 150[13] | 1.03 | 0.25 | 0.00 | 0.00 | 0.00 |
| Total | 223.55 | 222.77 | 222.67 | 222.77 | 223.52 |

[9]MB-1 is the batch provided as set forth in Table II.
[10]N-t-butyl-2-benzothiazole sulfenamide available from Uniroyal Chemical Company.
[11]Sulfur available from C.P. Hall.
[12]Tetrabenzyl thiuram disulfide available from Uniroyal Chemical Company.
[13]Tetraalkyl ($C_{12}$–$C_{14}$) thiuram disulfide available from Uniroyal Chemical Company.

Results

The compounded stocks prepared above were then sheeted out and cut for cure. The samples were cured for the times and at the temperatures indicated in Table IV and their physical properties evaluated. The results are summarized in Table IV below. Note that in Table IV, cure characteristics were determined using a Monsanto rheometer ODR 2000 (1° ARC, 100 cpm): MH is the maximum torque and ML is the minimum torque. Scorch safety ($t_s2$) is the time to 2 units above minimum torque (ML), cure time ($t_{50}$) is the time to 50% of delta torque above minimum and cure time ($t_{90}$) is the time to 90% of delta torque above minimum. Tensile Strength, Elongation and Modulus were measured following procedures in ASTMD-412. Examples 1–4 illustrate a rubber composition within the scope of this invention. Comparative Example A represents a rubber composition outside the scope of this invention.

TABLE IV

CURED PHYSICAL PROPERTIES

| Example or Comparative Example | 1 | 2 | 3 | 4 | A |
|---|---|---|---|---|---|
| Cured Characteristics obtained at 160° C. | | | | | |
| ML (lb-in.) | 5.48 | 5.74 | 5.68 | 5.69 | 4.96 |
| MH (lb-in.) | 30.38 | 29.34 | 31.37 | 32.27 | 28.24 |
| Scorch safety $t_s2$ (min) | 2.84 | 3.29 | 3.12 | 2.89 | 2.62 |
| Cure time $t_{50}$ (min) | 4.53 | 6.26 | 5.92 | 5.10 | 4.81 |
| Cure time $t_{90}$ (min) | 6.83 | 12.49 | 11.34 | 8.60 | 13.78 |
| Cured at 160° C. | | | | | |
| Cure time @ 160° C. (min) | 13.0 | 18.0 | 15.0 | 13.0 | 18.0 |
| 100% Modulus (Mpa) | 3.6 | 2.9 | 2.9 | 3.4 | 2.8 |
| 300% Modulus (Mpa) | 13.8 | 10.9 | 11.1 | 13.1 | 10.3 |
| Tensile Strength (Mpa) | 19.3 | 20.9 | 22.4 | 20.9 | 19.7 |
| Elongation, % at Break | 400.0 | 500.0 | 530.0 | 450.0 | 500.0 |
| Hardness, Shore A | 65.0 | 65.0 | 65.0 | 66.0 | 66.0 |
| Monsanto Fatigue to Failure | | | | | |
| Unaged (kilocycles to failure) | 189.1 | 357.1 | 265.1 | 361.8 | 381.3 |
| Aged 2 weeks at 70° C. (kilocycles to failure) | 89.9 | 226.8 | 69.4 | 132.3 | 135.9 |
| Mooney Scorch (MS at 135° C.) | | | | | |
| 3 Pt. Rise Time (min) | 12 | 13 | 13 | 12 | 10 |
| Tangent Delta 60° C. (10 Hz) [RPA-2000] % Strain | | | | | |
| 0.7 | 0.108 | 0.115 | 0.105 | 0.112 | 0.117 |
| 1.0 | 0.127 | 0.134 | 0.132 | 0.132 | 0.132 |
| 2.0 | 0.171 | 0.178 | 0.174 | 0.172 | 0.179 |
| 5.0 | 0.197 | 0.215 | 0.205 | 0.210 | 0.213 |
| 7.0 | 0.200 | 0.217 | 0.212 | 0.211 | 0.208 |
| 14.0 | 0.206 | 0.223 | 0.224 | 0.217 | 0.217 |

It can be seen from the above data that the examples containing a thiuram disulfide (Examples 1–4) provide superior performance when compared to the example containing diphenyl guanidine (Comparative Example A). The Mooney Scorch value for Example 1 was significantly higher than that of Comparative Example A.

The Mooney Scorch value for Example 2 was also significantly higher compared to that of Comparative Example A. The 100% and 300% Modulus and % elongation for Example 2 are comparable to those of Example A. Thus, by replacing 1 phr of diphenyl guanidine with 0.25 phr of tetraalkyl($C_{12}$–$C_{14}$) thiuram disulfide, the scorch safety of the rubber composition has been significantly improved without any sacrifice in physical properties resulting in an economical cost advantage being realized.

Examples 3 and 4 also provided a Mooney Scorch value that was also significantly higher compared to that of Comparative Example A. The 1000% and 300% Modulus and % elongation for Examples 3 and 4 are comparable to those of Example A. Thus, by replacing 1 phr of diphenyl guanidine with small amounts of tetrabenzyl thiuram disulfide, the scorch safety of the rubber composition has been significantly improved without any sacrifice in physical properties resulting in an economical cost advantage being realized.

What is claimed is:

1. A rubber composition comprising (a) a rubber component, (b) a silica filler; and, (c) at least one thiuram disulfide accelerator of the general formula

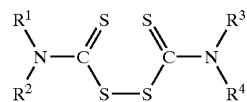

wherein $R^1$, $R^2$, $R^3$ and $R^4$ each are the same or different and are hydrocarbons of between 8 and 18 carbon atoms, optionally containing one or more heterocyclic groups, or $R^1$ and $R^2$ and/or $R^3$ and $R^4$ together with the nitrogen atom to which they are bonded are joined together to form a heterocyclic group, optionally containing one or more heterocyclic groups, it being provided that diphenyl guanidine is substantially absent in the rubber composition.

2. The rubber composition of claim 1 wherein the rubber component is selected from the group consisting of natural rubber, homopolymers of conjugated diolefins, copolymers of conjugated diolefins and ethylenically unsaturated monomers and mixtures thereof.

3. The rubber composition of claim 1 wherein the rubber component is selected from the group consisting of natural rubber, cis-polyisoprene, polybutadiene, poly(styrene-butadiene), styrene-isoprene copolymers, isoprene-butadiene copolymers, styrene-isoprene-butadiene tripolymers, polychloroprene, chloro-isobutene-isoprene, nitrile-chloroprene, styrene-chloroprene, and poly(acrylonitrile-butadiene).

4. The rubber composition of claim 1 wherein the silica filler is selected from the group consisting of silica, precipitated silica, amorphous silica, vitreous silica, fumed silica, fused silica, synthetic silicate, alkaline earth metal silicate, highly dispersed silicate and mixtures thereof.

5. The rubber composition of claim 1 wherein the silica filler is present in an amount from about 10 to about 100 parts per hundred parts of rubber (phr).

6. The rubber composition of claim 1 further comprising a carbon black filler.

7. The rubber composition of claim 6 wherein the carbon black filler is present in an amount from about 20 to about 200 phr.

8. The rubber composition of claim 1 wherein $R^1$, $R^2$, $R^3$ and $R_4$ each are hydrocarbons of between 12 and 14 carbon atoms.

9. The rubber composition of claim 1 wherein the thiuram disulfide is present in an amount of from about 0.05 to about 20 phr.

10. The rubber composition of claim 1 further comprising a coupling agent selected from the group consisting of vinyltrichlorosilane, vinyltrimethoxysilane, vinyltriethoxysilane, vinyltris(β-methoxyethoxy) silane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, N-β(aminoethyl)-γ-aminopropylmethyldimethoxysilane, N-β-(aminoethyl)γ-aminopropyltrimethoxysilane, N-β(aminoethyl)γ-aminopropyltrimethoxysilane, γ-aminopropyltrimethoxysilane, γ-aminopropyltrimethoxysilane, N-phenyl-γ-aminopropyltrimethoxysilane, γ-chloropropyltrimethoxysilane, γ-mercaptopropyltrimethoxysilane, bis-(3-[triethoxysilyl]propyl)tetrasulfane, bis-[3-(triethoxysilyl)propyl]

tetrasulfide; 3-trimethoxysilylpropyl-N,N-dimethylthiocarbamoyltetrasulfide; trimethoxysilylpropyl-mercaptobenz-thiazoltetrasulfide; triethoxysilylpropyl-methacrylate monosulfide; dimethoxymethylsilylpropyl-N,N-dimethyl-thiocarbamoyltetrasulfide; dithiodipropionic acid and mixtures thereof.

11. The rubber composition of claim 1 which is a tire tread, motor mount, rubber bushing, power belt, printing roll, rubber shoe heel and sole, rubber floor tile, caster wheel, elastomer seal and gasket, conveyor belt cover, hard rubber battery case, automobile floor mat, truck mud flap, ball mill liner or windshield wiper blade.

12. The rubber composition of claim 1 further comprising at least one other additive selected from the group consisting of vulcanizing agents, activators, retarders, antioxidants, plasticizing oils, and softeners, reinforcing pigments, antiozonants, waxes, tackifier resins and combinations thereof.

13. The rubber composition of claim 1 having a Mooney Scorch value greater than that of a similar rubber composition in which a significant amount up to the entire amount of the thiuram disulfide accelerator is replaced with diphenyl guanidine accelerator.

14. A method for increasing the Mooney Scorch value of a rubber composition which comprises the steps of forming a rubber composition comprising (a) a rubber component; (b) a silica filler; and, (c) at least one thiuram disulfide accelerator of the general formula

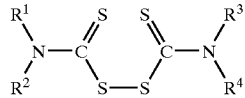

wherein $R^1$, $R^2$, $R^3$ and $R^4$ each are the same or different and are hydrocarbons of between 8 and 18 carbon atoms, optionally containing one or more heterocyclic groups, or $R^1$ and $R^2$ and/or $R^3$ and $R^4$ together with the nitrogen atom to which they are bonded are joined together to form a heterocyclic group, optionally containing one or more heterocyclic groups, it being provided that diphenyl guanidine is substantially absent in the rubber composition.

15. The method of claim 14 wherein the rubber component is selected from the group consisting of natural rubber, homopolymers of conjugated diolefins, copolymers of conjugated diolefins and ethylenically unsaturated monomers and mixtures thereof.

16. The method of claim 14 wherein the silica filler is selected from the group consisting of silica, precipitated silica, amorphous silica, vitreous silica, fumed silica, fumed silica, synthetic silicate, alkaline earth metal silicate, highly dispersed silicate and mixtures thereof.

17. The method of claim 14 wherein the silica filler is present in an amount from about 10 to about 100 phr.

18. The method of claim 14 wherein $R^1$, $R^2$, $R^3$ and $R^4$ of the thiuram disulfide each are hydrocarbons of between 12 and 14 carbon atoms.

19. The method of claim 18 wherein the thiuram disulfide is present in an amount from about 0.05 to about 20 phr.

20. The method of claim 14 wherein the rubber composition further comprises a coupling agent selected from the group consisting of vinyltrichlorosilane, vinyltrimethoxysilane, vinyltriethoxysilane, vinyltris(β-methoxyethoxy) silane, β(3,4-epoxycyclohexyl) ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, N-β(aminoethyl)-γ-aminopropylmethyldimethoxysilane, N-β-(aminoethyl)γ-aminopropyltrimethoxysilane, N-β(aminoethyl)γ-aminopropyltriethoxysilane, γ-aminopropyltrimethoxysilane, γ-aminopropyltriethoxysilane, N-phenyl-γ-aminopropyltrimethoxysilane, γ-chloropropyltrimethoxysilane, γ-mercaptopropyltrimethoxysilane, bis-(3-[triethoxysilyl]-propyl)-tetrasulfane, bis-[3-(triethoxysilyl)-propyl] tetrasulfide; 3-trimethoxysilylpropyl-N,N-dimethylthiocarbamoyltetrasulfide; trimethoxysilylpropyl-mercaptobenz-thiazoltetrasulfide; triethoxysilylpropyl-methacrylate monosulfide; dimethoxymethylsilylpropyl-N,N-dimethyl-thiocarbamoyltetrasulfide; dithiodipropionic acid and mixtures thereof.

* * * * *